(12) United States Patent
Gill

(10) Patent No.: US 6,252,750 B1
(45) Date of Patent: Jun. 26, 2001

(54) READ HEAD WITH FILE RESETTABLE DOUBLE ANTIPARALLEL (AP) PINNED SPIN VALVE SENSOR

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/360,398

(22) Filed: Jul. 23, 1999

(51) Int. Cl.[7] .................................................. G11B 5/31
(52) U.S. Cl. ....................................................... 360/324.11
(58) Field of Search ................................ 360/314, 324.11, 360/324.12

(56) References Cited

U.S. PATENT DOCUMENTS

| | | | |
|---|---|---|---|
| 5,701,223 | * 12/1997 | Fontana, Jr. et al. | 360/113 |
| 5,768,069 | * 6/1998 | Mauri | 360/113 |
| 6,038,107 | * 3/2000 | Pinarbasi | 360/113 |
| 6,122,150 | * 9/2000 | Gill | 360/324.11 |

* cited by examiner

*Primary Examiner*—David Davis
*Assistant Examiner*—Angel Castro
(74) *Attorney, Agent, or Firm*—Gray Cary Ware & Freidenrich; Ervin F. Johnston (57) ABSTRACT

A spin valve sensor is provided with a free layer structure which is located between first and second AP pinned layer structures wherein the first AP pinned layer structure includes first and second AP pinned layers and the second AP pinned layer structure includes first, second and third AP pinned layers. With this arrangement the magnetic spins of first and second pinning layers exchange coupled to the first and second AP pinned layer structures can be set by a current pulse conducted through a sense current circuit which sufficiently raises the temperature of the first and second pinning layers and exerts sense current fields appropriately directed to cause the setting of the magnetic spins of the first and second pinning layers. This arrangement allows the spin valve sensor to be reset in a magnetic disk drive without the application of a field from an exterior source in the presence of heat from an exterior source.

54 Claims, 9 Drawing Sheets

FIG. 11 (ABS) (PRIOR ART)

READ HEAD WITH FILE RESETTABLE DOUBLE ANTIPARALLEL (AP) PINNED SPIN VALVE SENSOR

BACKGROUND OF THE INVENTION

1. Field of the Invention

The present invention relates to a read head with a file resettable double antiparallel (AP) pinned spin valve sensor and more particularly to a spin valve sensor wherein a current pulse is employed for resetting magnetic spins of first and second pinnning layers that pin first and second AP pinned layer structures of the spin valve sensor.

2. Description of the Related Art

A spin valve sensor is employed by a read head for sensing magnetic fields on a moving magnetic medium, such as a rotating magnetic disk. A typical sensor includes a nonmagnetic electrically conductive first spacer layer sandwiched between a ferromagnetic pinned layer and a ferromagnetic free layer. An antiferromagnetic pinning layer interfaces the pinned layer for pinning a magnetic moment of the pinned layer 90° to an air bearing surface (ABS) which is an exposed surface of the sensor that faces the magnetic medium. First and second leads are connected to the spin valve sensor for conducting a sense current therethrough. A magnetic moment of the free layer is free to rotate in positive and negative directions from a quiescent or bias point position in response to positive and negative magnetic field signals from a rotating magnetic disk. The quiescent position, which is typically parallel to the ABS, is the position of the magnetic moment of the free layer with the sense current conducted through the sensor in the absence of signal fields. If the quiescent position of the magnetic moment is not parallel to the ABS in the absence of a signal field the positive and negative responses of the free layer to positive and negative signal fields will not be equal which results in read signal asymmetry which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons are scattered at the interfaces of the spacer layer with respect to the pinned and free layers. When the magnetic moments of the pinned and free layers are parallel with respect to one another scattering is at. a minimum and when their magnetic moments are antiparallel scattering is maximized. Changes in scattering in response to signal fields from a rotating disk changes the resistance of the spin valve sensor as a function of $\cos\theta$, where $\theta$ is the angle between the magnetic moments of the pinned and free layers. The sensitivity of the sensor is quantified as magnetoresistive coefficient dr/R where dr is the change in resistance of the sensor between parallel and antiparallel orientations of the pinned and free layers and R is the resistance of the sensor when the moments are parallel.

The transfer curve (readback signal of the spin valve head versus applied signal from the magnetic disk) of a spin valve sensor is a substantially linear portion of the aforementioned function of $\cos\theta$. The greater this angle, the greater the resistance of the spin valve to the sense current and the greater the readback signal (voltage sensed by processing circuitry). With positive and negative signal fields from a rotating magnetic disk (assumed to be equal in magnitude), it is important that positive and negative changes of the resistance of the spin valve sensor be equal in order that the positive and negative magnitudes of the readback signals are equal. When this occurs a bias point on the transfer curve is considered to be zero and is located midway between the maximum positive and negative readback signals. When the direction of the magnetic moment of the free layer is parallel to the ABS, and the direction of the magnetic moment of the pinned layer is perpendicular to the ABS in a quiescent state (absence of signal fields) the bias point is located at zero and the positive and negative readback signals will be equal when sensing positive and negative signal fields from the magnetic disk. The readback signals are then referred to in the art as having symmetry about the zero bias point. When the readback signals are not equal the readback signals are asymmetric which equates to reduced storage capacity.

The location of the bias point on the transfer curve is influenced by three major forces on the free layer, namely a demagnetization field $(H_D)$ from the pinned layer, a ferromagnetic coupling field $(H_F)$ between the pinned layer and the free layer, and sense current fields $(H_I)$ from all conductive layers of the spin valve except the free layer. When the sense current is conducted through the spin valve sensor, the pinning layer (if conductive), the pinned layer and the first spacer layer, which are all on one side of the free layer, impose sense current fields on the free layer that rotate the magnetic moment of the free layer in a first direction. The ferromagnetic coupling field from the pinned layer further rotates the magnetic moment of the free layer in the first direction. The demagnetization field from the pinned layer on the free layer rotates the magnetic moment of the free layer in a direction opposite to the first direction. Accordingly, the demagnetization field opposes the sense current and ferromagnetic coupling fields and can be used for counterbalancing.

In some spin valve sensors an antiparallel (AP) pinned layer structure is substituted for the typical single layer pinned layer. The AP pinned layer structure includes a nonmagnetic AP coupling layer between first and second AP pinned layers. The first AP pinned layer is exchange coupled to the antiferromagnetic pinning layer which pins the magnetic moment of the first AP pinned layer in the same direction as the magnetic spins of the pinning layer. By exchange coupling between the first and second AP pinned layers the magnetic moment of the second AP pinned layer is pinned antiparallel to the magnetic moment of the first AP pinned layer. An advantage of the AP pinned layer structure is that demagnetization fields of the first and second AP pinned layers partially counterbalance one another so that a small demagnetization field is exerted on the free layer for improved biasing of the free layer. Further, the first AP pinned layer can be thinner than the single pinned layer which increases an exchange coupling field between the pinning layer and the first AP pinned layer.

In both the single pinned layer and the AP pinned layer type of spin valve sensor the magnetic spins of the pinning layer are set by applying a field from an exterior source in the presence of heat from an exterior source. This is typically accomplished at the wafer and/or row level in the construction of multiple magnetic heads arranged in rows and columns on a wafer. It is not practical to employ this process to reset the magnetic spins of the pinning layer at the file level magnetic head mounted in a magnetic disk drive because of a degradation of the head components by the applied heat. If the magnetic spins of the pinning layer become disoriented at the file level the disk drive may be rendered inoperable.

Over the years a significant amount of research has been conducted to improve symmetry of the read signals, the magnetoresistive coefficient dr/R and the read gap. The read gap, which is the distance between the first and second shield layers, should be minimized to increase the linear bit reading density of the read head. These efforts have increased the storage capacity of computers from kilobytes to megabytes to gigabytes.

SUMMARY OF THE INVENTION

I have provided a spin valve sensor which has improved magnetoresistive coefficient dr/R, improved read signal symmetry, a narrower gap and which can be reset in a magnetic disk drive in contrast to being reset at the wafer or row level. This has been accomplished by providing first and second AP pinned structures with the first AP pinned structure being on one side of the free layer and separated therefrom by a first spacer layer and a second AP pinned structure on the other side of the free layer and separated therefrom by a second spacer layer. The first AP pinned structure has first and second AP pinned layers that are separated by an AP coupling layer and the second AP pinned structure has first, second and third AP pinned layers that are separated by first and second AP coupling layers. With this arrangement the first AP pinned layer of the first AP pinned structure and the third AP pinned layer of the second AP pinned structure interface the first and second spacer layers and have their magnetic moments in phase which means that they are parallel with respect to one another. Accordingly, as the magnetic moment of the free layer is rotated upwardly or downwardly in response to signal fields a double spin valve effect is obtained on each side of the free layer which are additive to significantly increase the magnetoresistive coefficient dr/R of this spin valve sensor as compared to a simple spin valve sensor with a pinned structure only on one side of the free layer.

Read signal symmetry is easier to obtain with the present spin valve sensor. Since the magnetic moments of the AP pinned layers that interface the first and second spacer layers are in phase ferromagnetic coupling fields between these AP pinned layers and the free layer will be additive which exert a force to rotate the magnetic moment of the free layer in one direction. Each of the pinned layer structures have a net demagnetization field that is exerted on the free layer. However, these demagnetization fields are in opposite directions and can be made to completely counterbalance one another or provide a net demagnetization field which helps to counterbalance the ferromagnetic coupling fields. If the net demagnetization field from each of the AP pinned structures are equal so as to counterbalance one another an extra thickness of the metallic layers of the triple AP pinned structure may be employed for providing a sense current field which counterbalances the ferromagnetic coupling fields on the free layer. The present spin valve sensor provides many options for positioning the magnetic moment of the free layer so that the free layer operates from the zero bias point on its transfer curve in a quiescent condition.

The present spin valve sensor also provides a very significant advantage in setting or resetting the magnetic spins of first and second antiferromagnetic pinning layers which are exchange coupled to the first and second AP pinned structures. A current pulse can be conducted by a sense current circuit through the spin valve sensor for setting the magnetic spins of the first and second pinning layers. I have found that a voltage pulse of approximately 1.0 volt, which is approximately three times the sense voltage Vs, for a period of approximately 100 nanoseconds (ns) is sufficient for raising the temperature of the pinning layers and providing sense current fields on the AP pinned structures which causes the magnetic spins of the first and second pinning layers to be oriented in the desired directions. This type of setting is in contrast to the prior art method of setting where a field from an exterior source in the presence of a temperature from an exterior source is employed for resetting the magnetic spins of the pinning layers. With the present spin valve sensor the magnetic spins of the pinning layers can be reset in a magnetic disk drive which is referred to hereinafter as file resettable. In order to keep the required temperature low for resetting I employ a material for each of the first and second pinning layers that has a blocking temperature below 280° C. Materials can be selected from the group comprising iridium manganese (IrMn), nickel oxide (NiO) and iron manganese (FeMn) with the preferred material being iridium manganese (IrMn). Blocking temperature is the temperature at which the magnetic spins of the antiferromagnetic pinning layer are free to rotate in response to an applied field. Iridium manganese (IrMn) has a blocking temperature of 250° C. to 260° C. Significantly, however, is that only 60 Å to 80 Å of iridium manganese (IrMn) is required to function as a pinning layer as compared to nickel oxide (NiO) which is required to be approximately 425 Å in order to function as a pinning layer. Accordingly, in a preferred embodiment each of the first and second pinning layers in the present invention is iridium manganese (IrMn) which promotes a narrow gap for the read head. As stated hereinabove, a narrow gap equates to increased storage capacity of the magnetic disk drive.

An object of the present invention is to provide a spin valve sensor which has improved magnetoresistive coefficient dr/R, improved read signal symmetry, a narrower gap and which can be reset in a magnetic disk drive.

Another object is to provide a file resettable spin valve sensor that has a double AP pinned structure.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
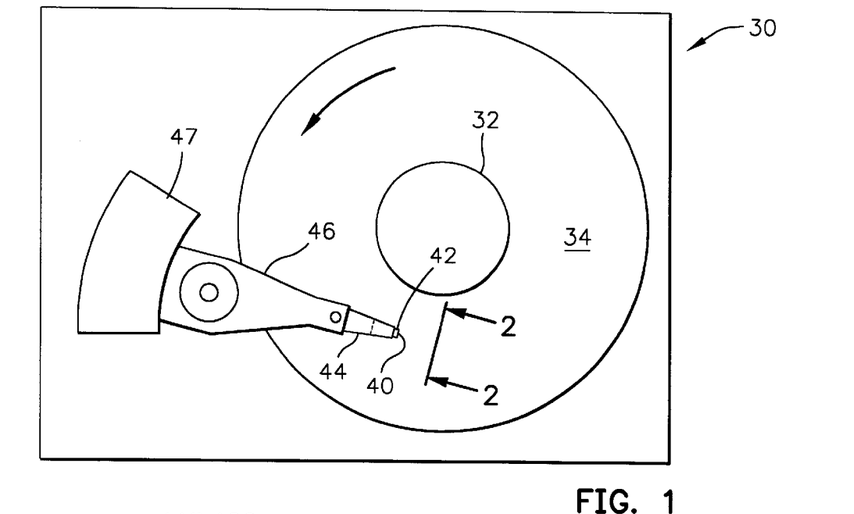
FIG. 1 is a plan view of an exemplary magnetic disk drive.
Figure 2:
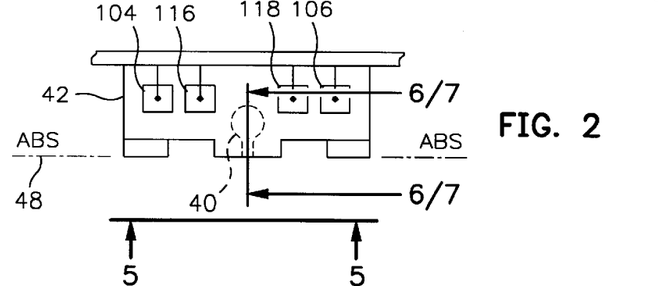
FIG. 2 is an end view of a slider with a magnetic head of the disk drive as seen in plane 2—2.
Figure 3:
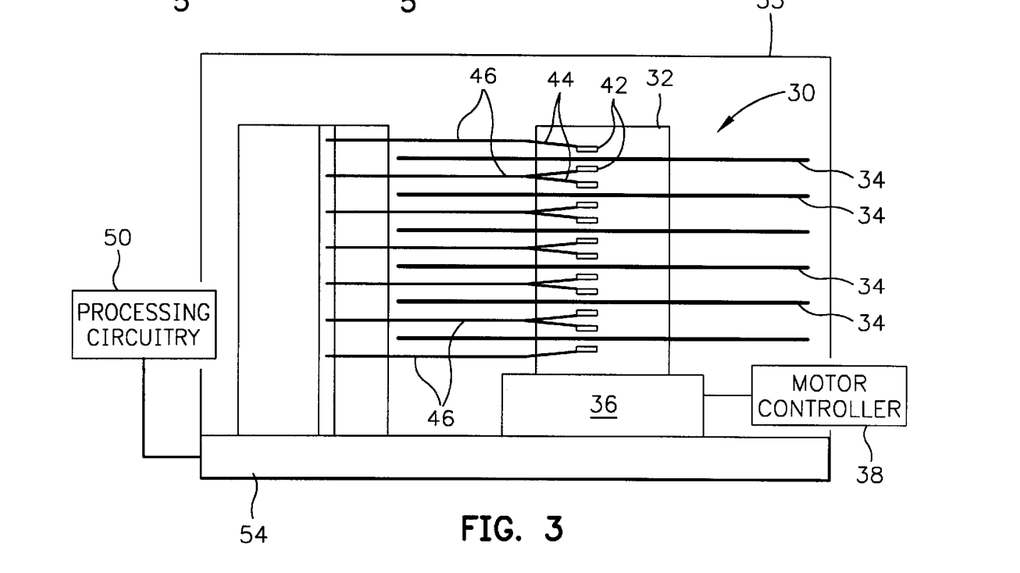
FIG. 3 is an elevation view of the magnetic disk drive wherein multiple disks and magnetic heads are employed.
Figure 4:
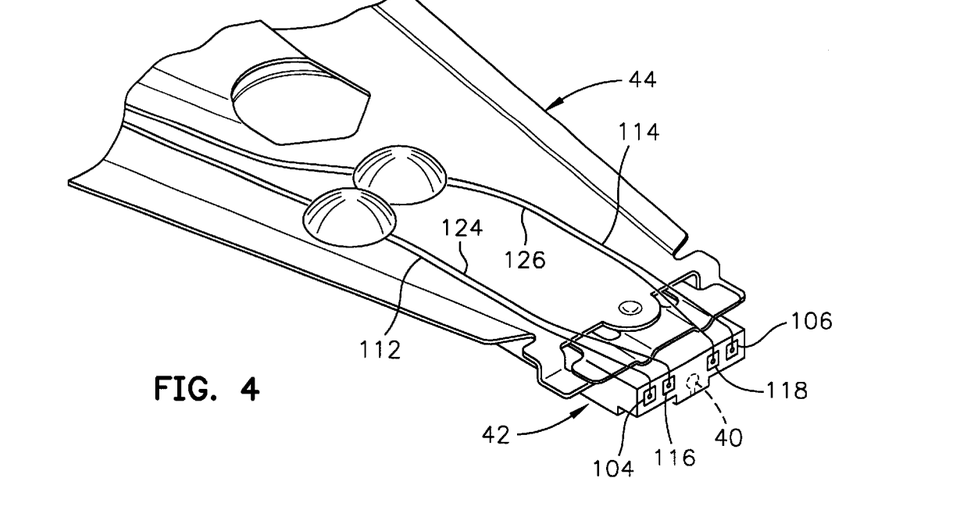
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 supports a combined read and write magnetic head 40 and is supported by a suspension 44 and actuator arm 46 which is rotatably positioned by an actuator 47. A plurality of disks, sliders and suspensions may be employed in a large capacity direct access storage device (DASD) as shown in FIG. 3. The actuator 47 moves the actuator arm 46 and the suspension 44 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator 47 for moving the slider to various tracks. In FIG. 4 the slider 42 is shown mounted to a suspension 44. The components described hereinabove may be mounted on a frame 54 of a housing 55, as shown in FIG. 3.

Figure 5:
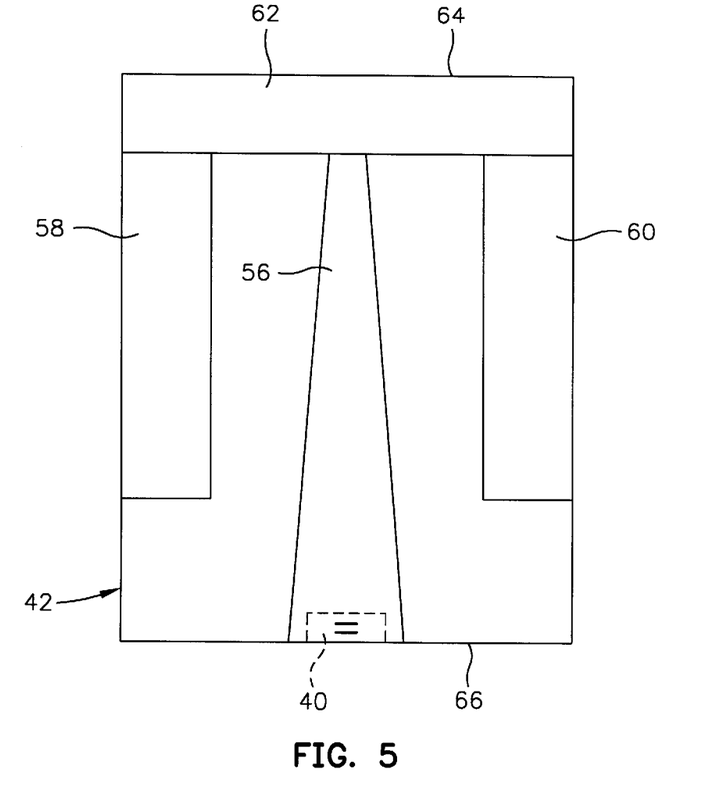
FIG. 5 is an ABS view of the slider taken along plane 5—5 of FIG. 2.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
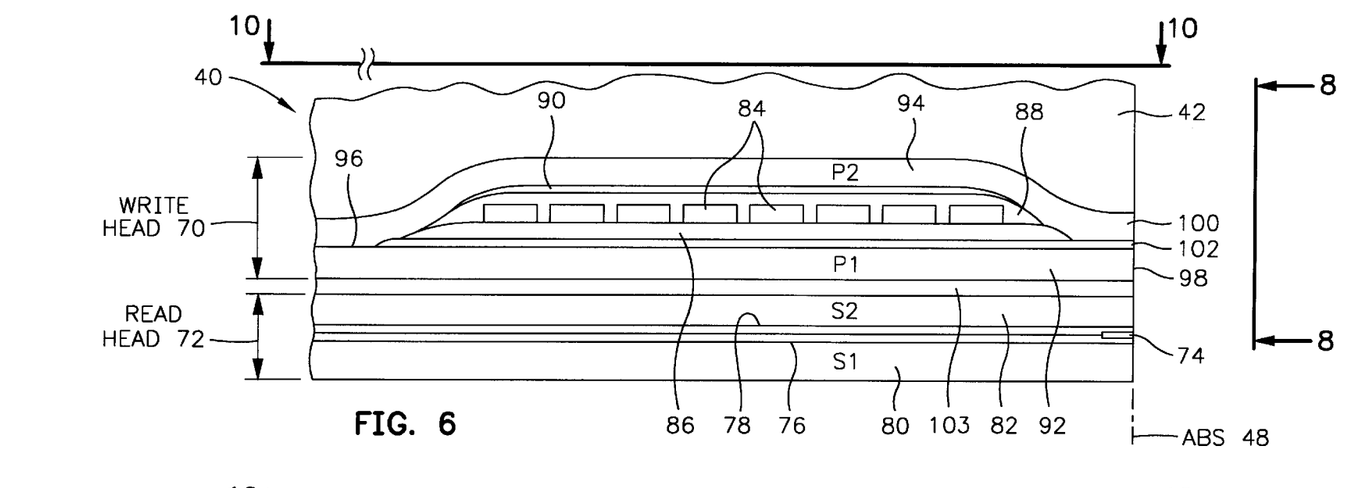
FIG. 6 is a partial view of the slider and a piggyback magnetic head as seen in plane 6—6 of FIG. 2.
Figure 8:
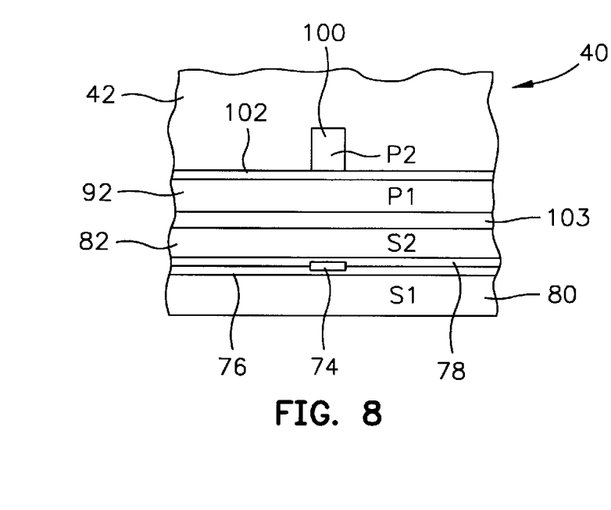
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_s$ conducted through the sensor causes these resistance changes to be manifested as potential changes. These potential changes are then processed as readback signals by the processing circuitry 50 shown in FIG. 3.

Figure 10:
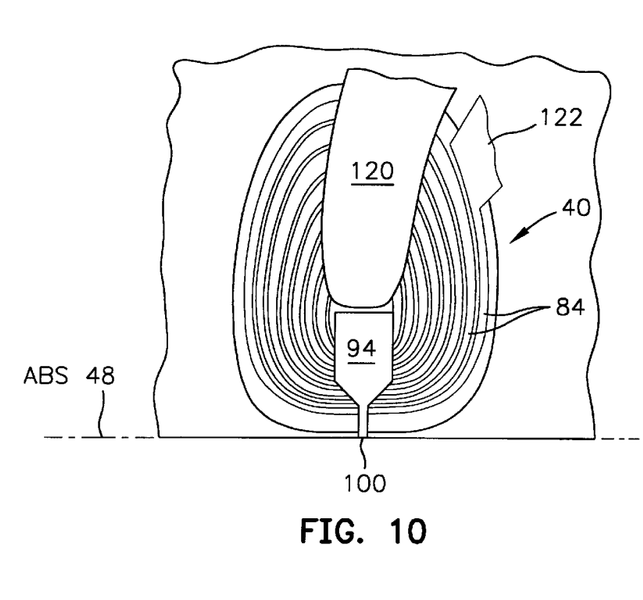
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 7:
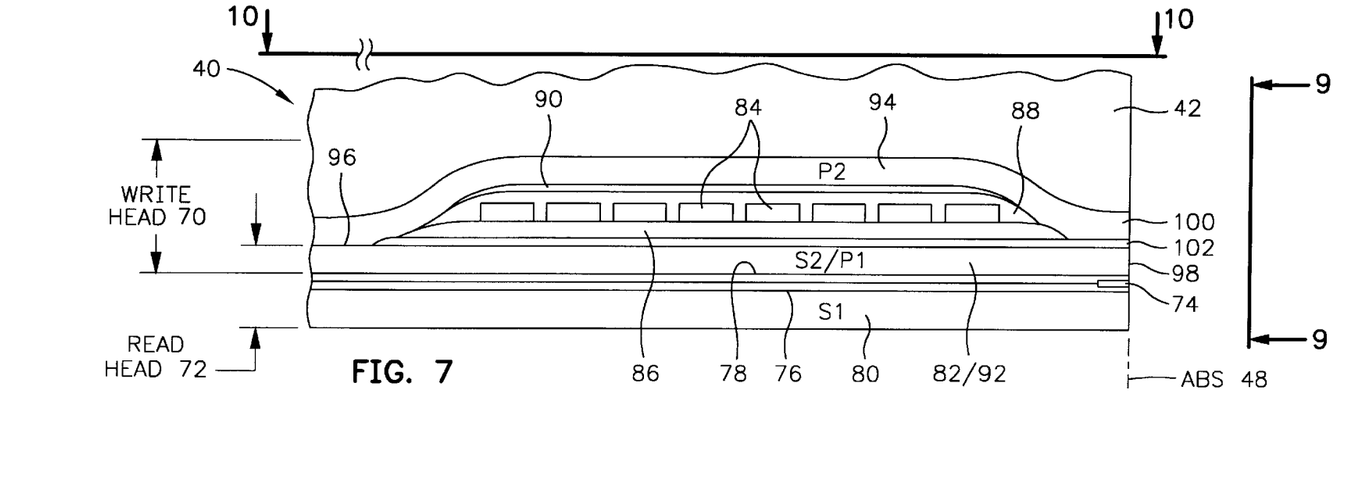
FIG. 7 is a partial view of the slider and a merged magnetic head as seen in plane 7—7 of FIG. 2.
Figure 9:
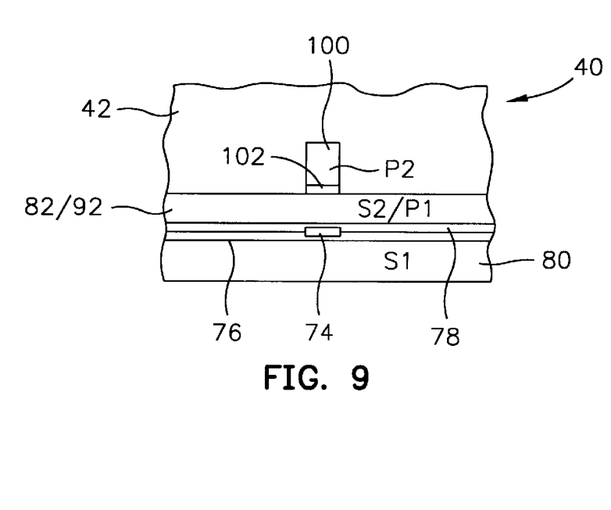
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
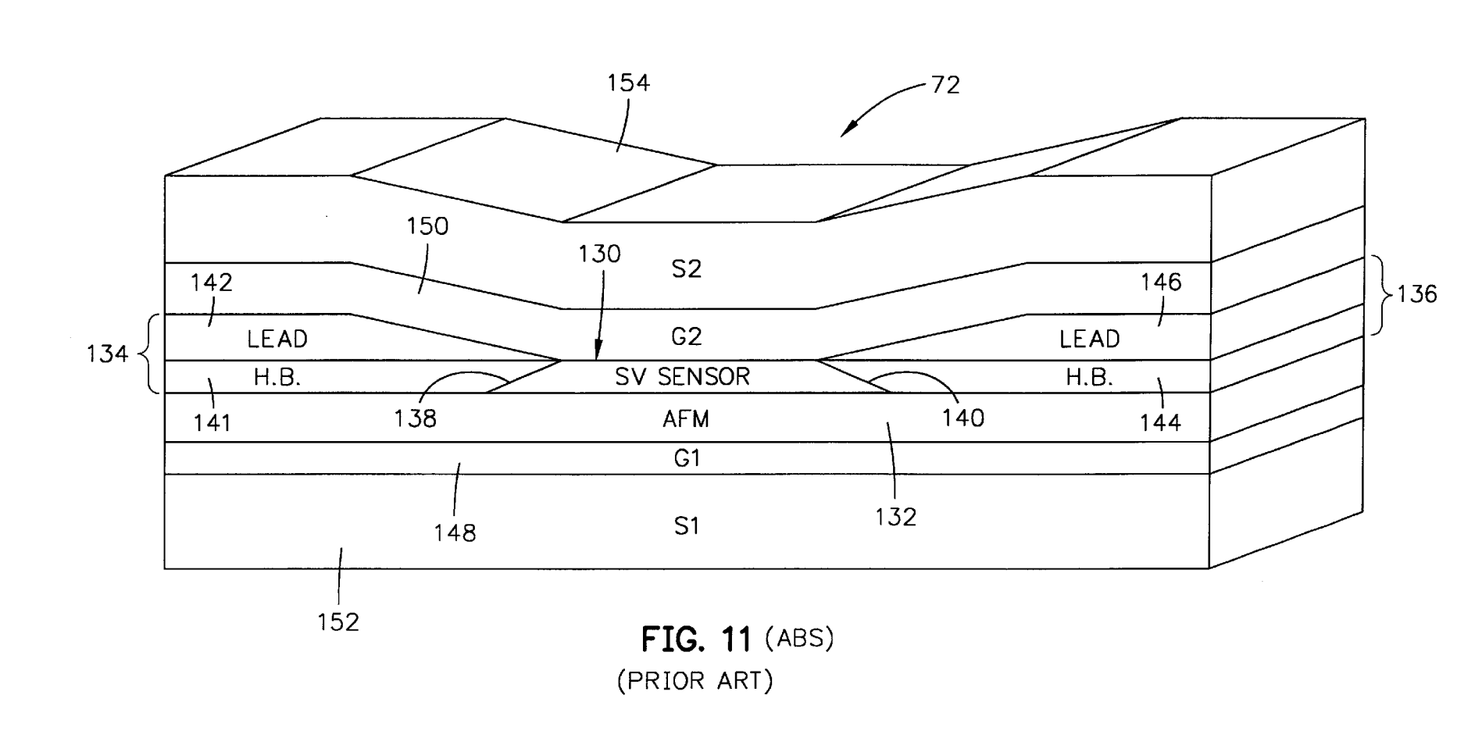
FIG. 11 is an isometric ABS illustration of a prior art read head which employs a spin valve sensor longitudinally biased by hard biasing layers.

FIG. 11 is an isometric ABS illustration of a prior art read head 72 which has a spin valve sensor 130. The spin valve sensor 130 has a pinned layer structure, to be described hereinafter, which has a magnetic moment that is pinned by an antiferromagnetic (AFM) pinning layer 132. First and second hard bias and lead layers 134 and 136 are connected to first and second side edges 138 and 140 of the spin valve sensor. This connection is known in the art as a contiguous junction and is fully described in commonly assigned U. S. Pat. 5,018,037. The first hard bias and lead layers 134 include a first hard bias layer 141 and a first lead layer 142 and the second hard bias and lead layers 136 include a second hard bias layer 144 and a second lead layer 146. The hard bias layers 140 and 144 cause magnetic flux to extend longitudinally through the spin valve sensor 130 for stabilizing magnetic domains of the free layer. The spin valve sensor 130 and the first and second hard bias and lead layers 134 and 136 are located between nonmagnetic electrically insulative first and second read gap layers 148 and 150. The first and second read gap layers 148 and 150 are, in turn, located between first and second shield layers 152 and 154.

The Invention

Figure 12:
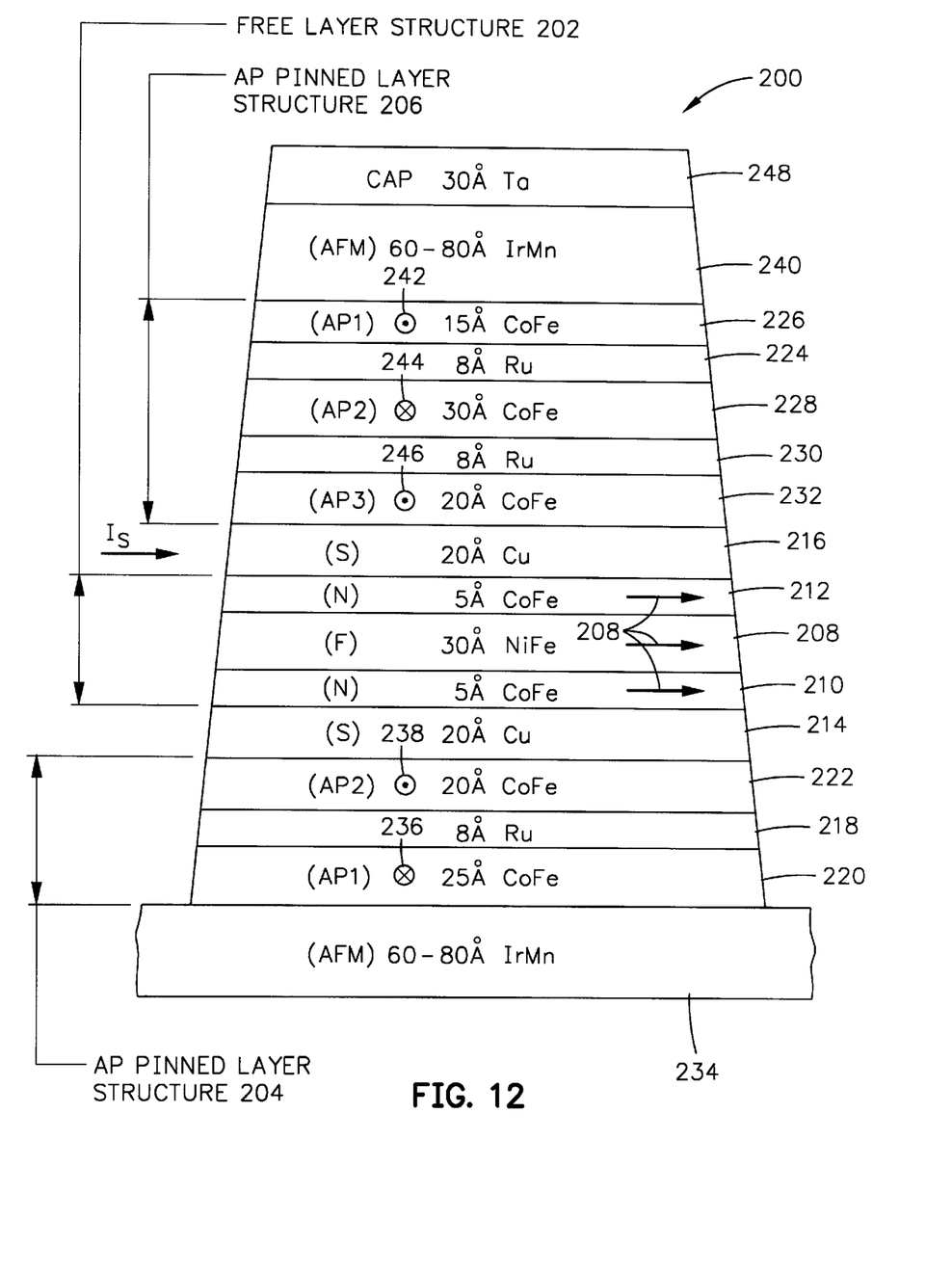
FIG. 12 is an ABS illustration of the present spin valve sensor.

FIG. 12 illustrates the present spin valve sensor 200 which has a free layer structure 202 which is located between first and second AP pinned layer structures 204 and 206. In a preferred embodiment the free layer structure 202 has a nickel iron (NiFe) free layer (F) 208 which is located between first and second cobalt (Co) based nanolayers (N) 210 and 212. The free layer structure 202 has a magnetic moment 208 which is substantially parallel to the ABS, either from right to left, or from left to right as shown in FIG. 12. A first spacer layer (S) 214 is located between the first AP pinned layer structure 204 and the free layer structure 202 and a second spacer layer (S) 216 is located between the second AP pinned layer structure 206 and the free layer structure.

The first AP pinned layer structure 204 includes an antiparallel coupling layer 218 which is located between first and second AP pinned layers (AP1) and (AP2) 220 and 222. The second AP pinned layer structure 206 includes a first AP coupling layer 224 which is located between first and second AP pinned layers (AP1) and (AP2) 226 and 228 and a second AP coupling layer 230 which is located between the second AP pinned layer 228 and a third AP pinned layer (AP3) 232. Accordingly, the first AP pinned layer structure 204 has two ferromagnetic layers 220 and 222 and the second AP pinned layer structure 206 has three ferromagnetic layers 226, 228 and 232. A first antiferromagnetic (AFM) pinning layer 234 is exchange coupled to the first AP pinned layer 220 which may set a magnetic moment 236 of the first AP pinned layer perpendicular to and away from the ABS as shown in FIG. 12. By antiparallel coupling between the first and second AP pinned layers 220 and 222 a magnetic moment 238 of the second AP pinned layer is oriented antiparallel to the magnetic moment 236. A second antiferromagnetic (AFM) pinning layer 240 is exchange coupled to the first AP pinned layer 226 which may pin a magnetic moment 242 of the first AP pinned layer perpendicular to and toward the ABS as shown in FIG. 12. By antiparallel coupling between the first and second AP pinned layers 226 and 228 a magnetic moment 244 of the second AP pinned layer 228 is oriented perpendicular to and away from the ABS and by antiparallel coupling between the second and third AP pinned layers 228 and 232 a magnetic moment 246 of the third AP pinned layer is oriented perpendicular to and toward the ABS as shown in FIG. 12.

With the above arrangement the orientations of the magnetic moments 238 and 246 are parallel with respect to one another which means they are in phase. This is required for the spin valve effect on each side of the free layer structure 202 to be additive. If a signal field causes the magnetic moment 208 of the free layer structure to rotate upwardly the resistance of the spin valve sensor will increase in the sense current circuit which conducts the sense current $I_s$ and if a signal field causes the magnetic moment 208 to rotate downwardly the resistance will decrease in the sense current circuit. These increases and decreases in the resistances of the spin valve sensor in response to signal fields are manifested as potential changes in the sense current circuit which can be processed by the processing circuitry 50 in FIG. 3 as playback signals.

Figure 13:
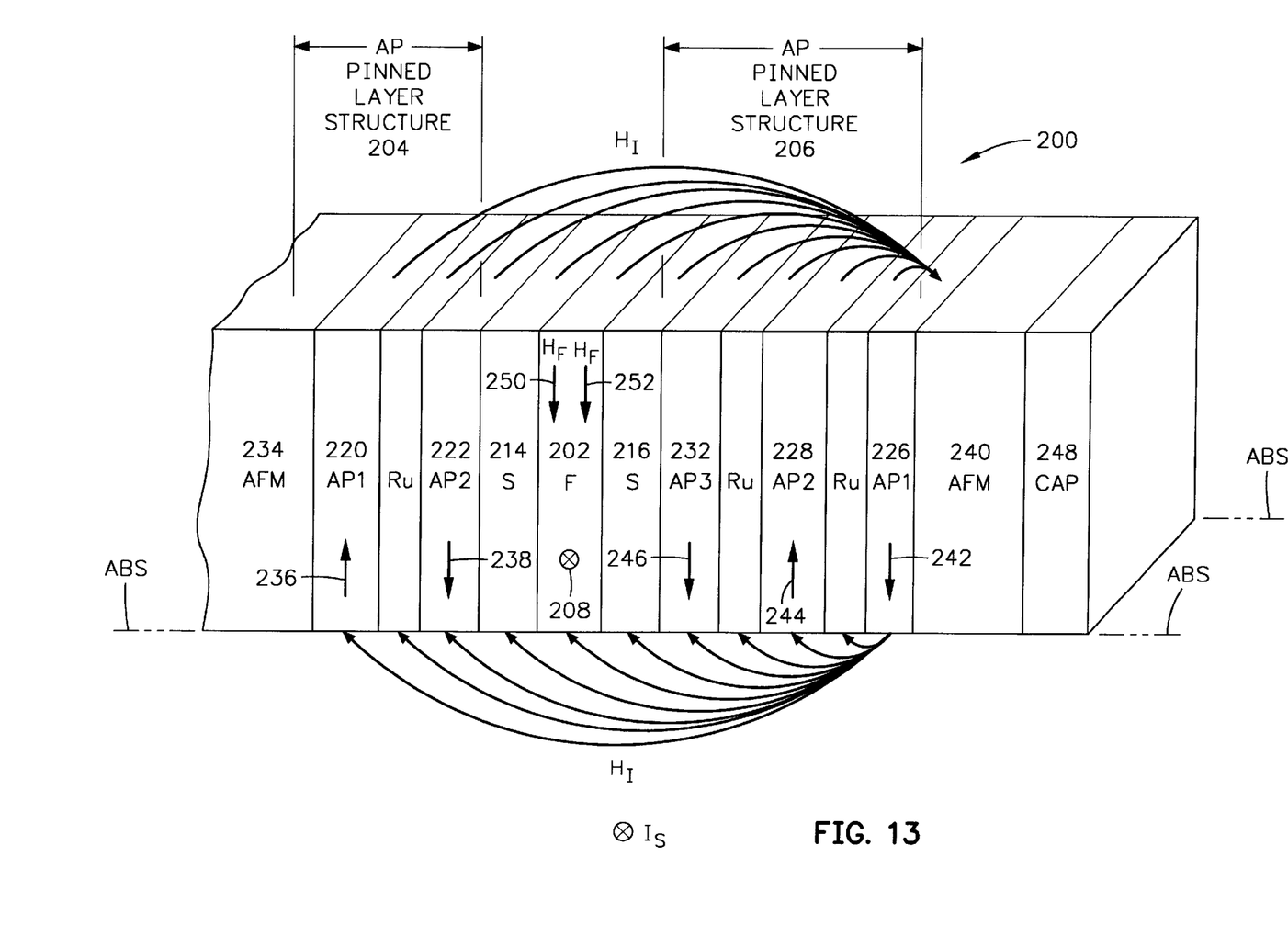
FIG. 13 is a side view of the present spin valve sensor after FIG. 12 has been rotated 90° clockwise and 90° toward the viewer.

From FIG. 13 it can be seen that the second AP pinned layer 222 exerts a ferromagnetic coupling field $H_F$ 250 on the free layer structure 202, which is perpendicular to and toward the ABS, and the third AP pinned layer 232 exerts a ferromagnetic coupling field $H_F$ 252, which is also perpendicular to and toward the ABS. Accordingly, the ferromagnetic coupling fields 250 and 252 are additive and tend to rotate the magnetic moment 208 of the free layer downwardly which affects the bias point of the free layer. The ferromagnetic coupling fields 250 and 252 may be completely counterbalanced by a net demagnetization field between the first and second AP pinned structures 204 and 206 exerted on the free layer structure 202 and/or by net sense current fields exerted on the free layer structure by the metallic layers on each side of the free layer structure. In the embodiment shown in FIG. 12 the net demagnetization fields of the first and second AP pinned layer structures 204 and 206 are equal so as to completely counterbalance one another. Accordingly, in this embodiment the sense current fields due to the sense current $I_s$ is employed for counterbalancing the ferromagnetic coupling fields 250 and 252. It can be seen from FIG. 12 that the first AP pinned structure 204 has 5 Å thick net of ferromagnetic material that produces a net demagnetization field that is perpendicular to and away from the ABS and the second AP pinned layer structure 206 has 5 Å thick net ferromagnetic material which produces a net demagnetization field which is perpendicular to and toward the ABS. Accordingly, the net demagnetization field of each of the first and second AP pinned layer structures 204 and 206 are equal and completely counterbalance each other.

As seen in FIG. 12, the sense current $I_s$ causes sense current fields (not shown) from the conductive layers below the free layer structure 202 to be exerted in the free layer structure in a direction perpendicular to and toward the ABS while the sense current fields from the conductive layers above the free layer structure are exerted on the free layer structure perpendicular to and away from the ABS. Since the second AP pinned layer structure 206 is thicker than the first AP pinned layer structure 204 there is a net sense current field on the free layer structure 202 that is perpendicular to and away from the ABS. This is opposite to the directions of the ferromagnetic coupling fields 250 and 252 in FIG. 13 so that counterbalancing can be achieved. Alternatively, the thicknesses of the AP pinned layers in the first and second AP pinned layer structures 204 and 206 can be adjusted so as to provide a net demagnetization field which is in the same direction as the ferromagnetic coupling fields 250 and 252 so that the sense current $I_s$ can be increased.

Figure 14:
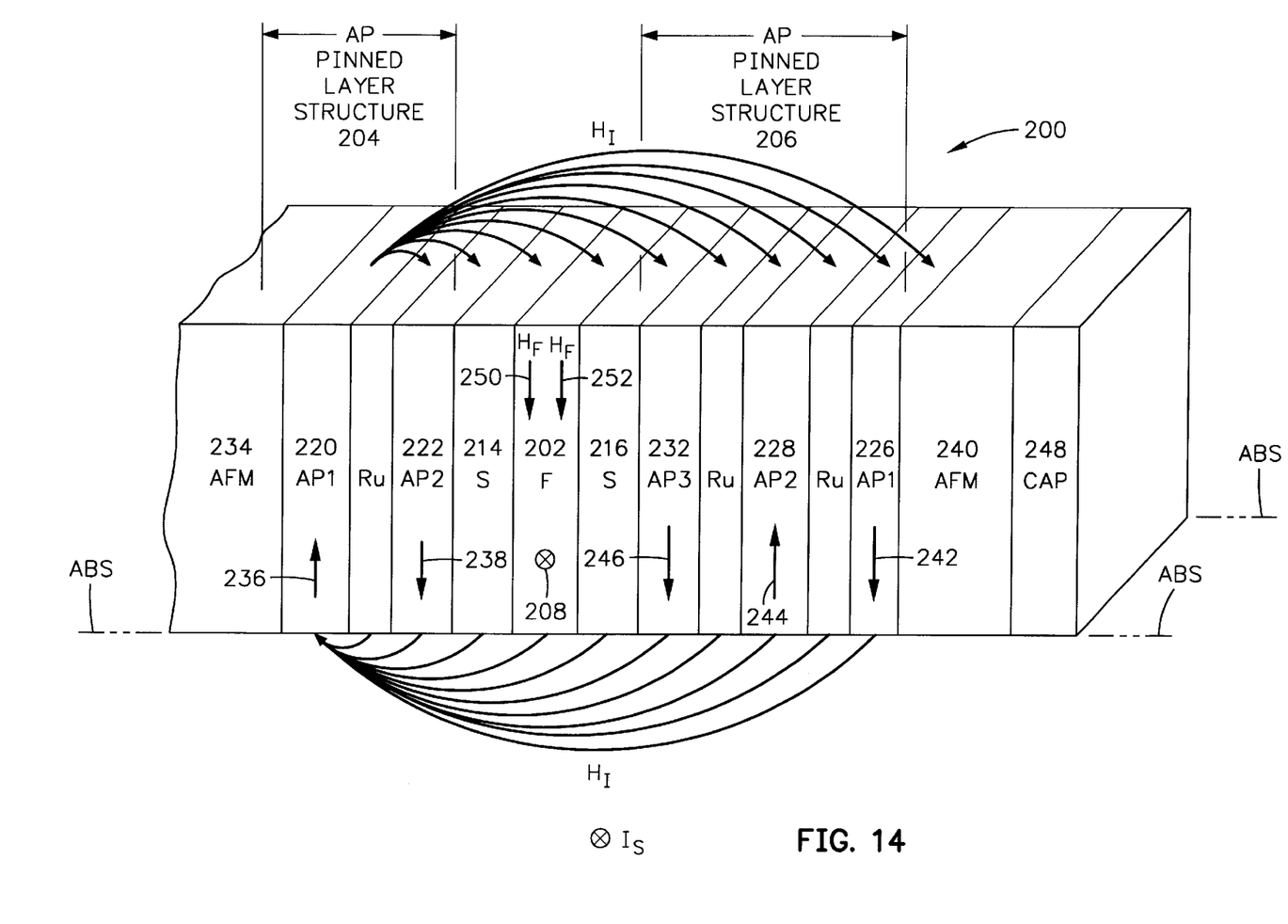
FIG. 14 is the same as FIG. 13 except different sense current fields are illustrated.

FIGS. 13 and 14 illustrate the manner in which the spin valve sensor 200 can be reset by conducting a voltage pulse through the spin valve sensor from the sense voltage circuit. If the spin valve sensor 200 is in a magnetic disk drive, as shown in FIG. 3, the processing circuitry 50 may be utilized for providing the voltage pulse to the spin valve sensor 200 via the sense voltage circuit which includes the first and second hard bias and lead layers 134 and 136 in FIG. 11. It is necessary that the voltage pulse raise the temperature of the first and second antiferromagnetic layers 234 and 240 at or near their blocking temperature. In the preferred embodiment the first and second antiferromagnetic layers 234 and 240 are iridium manganese (IrMn) which has a blocking temperature from 250° C. to 260° C. A typical sense voltage Vs is about 0.3 volts. I found that when the voltage pulse is about 1 volt, which is approximately three times the sense voltage Vs, for about 100 ns the temperature of the iridium manganese (IrMn) of the pinning layers 234 and 240 is sufficiently elevated so that the current fields caused by a current pulse through the conductive layers of the spin valve sensor orient the magnetic moment 236 of the first AP pinned layer perpendicular to and away from the ABS and the magnetic moments 242 and 246 of the first and third AP pinned layers of the second AP pinned layer structure to be directed perpendicular to and toward the ABS. When the voltage pulse is terminated and the sensor cools the magnetic spins of the pinning layers 234 and 240 pin the magnetic moments 236 and 242 of the first AP pinned layers 220 and 226 in the directions shown in FIG. 12.

It should be noted that the first AP pinned layer 220 of the first AP pinned layer structure is thicker than the second AP pinned layer 222 which means that the first AP pinned layer 220 is controlling when subjected to the current fields due to the current pulse. In the second AP pinned layer structure 206 the combined thicknesses of the first and third AP pinned layers 226 and 232 is greater than the thickness of the second AP pinned layer 228. Accordingly, the first and third AP pinned layers 226 and 232 are controlling when the AP pinned layer structure 206 is subjected to the current fields from the voltage pulse. It should be understood that the thicknesses of the AP pinned layers of the first and second AP pinned layer structures 204 and 206 are exemplary and may be varied as desired in order to practice the present invention. It should further be understood that the present spin valve sensor 200 may be reset at the wafer or row level in the construction of multiple magnetic heads by employing a current pulse generator to apply a voltage pulse to the terminals 104 and 106 shown in FIG. 2.

When a sense current $I_s$ is conducted into the paper as shown in FIG. 13 sense current fields $H_I$ from the conductive layers to the left of the first AP pinned layer 226 of the second AP pinned layer structure are exerted on the first AP pinned layer 226 which orients its magnetic moment 242 downwardly and toward the ABS. The sense current fields to the left of the third AP pinned layer 232 of the second AP pinned layer structure also orients the magnetic moment 246 of the third AP pinned layer downwardly and toward the ABS. The magnetic moments 242 and 246 are controlling since their total thickness is greater than the thickness of the second AP pinned layer 228 as discussed hereinabove. Since the first AP pinned layer 220 of the first AP pinned layer structure is controlling the sense current fields $H_I$ from the conductive layers to the right of the first AP pinned layer 220 in FIG. 14 are exerted on the first AP pinned layer 220. This causes the magnetic moment 236 of the first AP pinned layer to be directed perpendicular to and away from the ABS. Accordingly, a reset voltage pulse causing a current pulse in the same direction as the sense current $I_s$ in FIG. 12, will set the magnetic moments of the AP pinned layers of the first and second AP pinned layer structure 204 and 206 as shown in FIG. 12. I have found that a reset voltage pulse of approximately 1 volt for a period of 100 nanosecond (ns) is sufficient to accomplish the resetting of the magnetic spins of the pinning layers 234 and 240. A cap layer 248 is located on the second pinning layer 240 for protecting it from subsequent processing steps in the construction of the read head.

In the preferred embodiment the blocking temperature of the first and second pinning layers 234 and 248 is below 280° C. Materials with blocking temperatures below 280° C. are iridium manganese (IrMn) with a blocking temperature between 250° C. to 260° C., nickel oxide (NiO) with a blocking temperature between 215° C. to 225° C. and iron manganese (FeMn) with a blocking temperature of approximately 180° C. Of these materials iridium manganese (IrMn) is preferred since its thickness can be between 60 Å to 80 Å and still function as a pinning layer. Further, iridium manganese (IrMn) is not corrosive at its edge which interfaces the ABS. With iridium manganese (IrMn) first and second pinning layers 234 and 240 the read gap between the first and second shield layers 152 and 154 in FIG. 11 is minimized. Accordingly, the linear bit density of the read head is increased for increasing storage capacity of the disk drive shown in FIG. 3. It should also be noted that the sense current field $I_s$, as directed in FIG. 12, assists in properly pinning the first and second AP pinned layer structures 204 and 206 during operation of the sensor. The sense current $I_s$ causes a sense current field on the first AP pinned layer 220 which is in the same direction as the magnetic moment 236 and the sense current $I_s$ causes a sense current field on each of the first and second AP pinned layers 226 and 232 which is in the same direction as the magnetic moments 242 and 246. Accordingly, the sense current $I_s$ supplements the pinning of the first and second AP pinned layer structures 204 and 206 by the first and second pinning layers 234 and 240.

Exemplary thicknesses for the layers are 60 Å to 80 Å of iridium manganese (IrMn) for the first pinning layer 234, 25 Å of cobalt (Co) or cobalt iron (CoFe) for the first AP pinned layer 220, 8 Å of ruthenium (Ru) for the AP coupling layer 218, 20 Å of cobalt (Co) or cobalt iron (CoFe) for the second AP pinned layer 222, 20 Å of copper (Cu) for each of the first and second spacer layers 214 and 216, 5 Å of cobalt iron (CoFe) for the first and second nanolayers 210 and 212, 30 Å of nickel iron (NiFe) for the free layer 208, 20 Å of cobalt iron (CoFe) for the third AP pinned layer 232, 8 Å of ruthenium (Ru) for the second AP coupling layer 230, 30 Å of cobalt iron (CoFe) for the second AP pinned layer 228, 8 Å of ruthenium (Ru) for the first AP coupling layer 224, 15 Å oof cobalt (Co) or cobalt iron (CoFe) for the first AP pinned layer 226, 60 Å to 80 Å of iridium manganese (IrMn) for the second pinning layer 240 and 30 Å of tantalum (Ta) for the cap layer 248. It should be understood that cobalt (Co) or a cobalt alloy may be substituted for the cobalt iron (CoFe) layers in FIG. 12. It should further be noted that the cobalt based nanolayers 210 and 212 on each side of the free layer 208 and which are part of the free layer structure 206 are instrumental in promoting the magnetoresistive coefficient dr/R in contrast to the nickel iron (NiFe) free layer 208 interfacing the first and second spacer layers 214 and 216.

Figure 15:
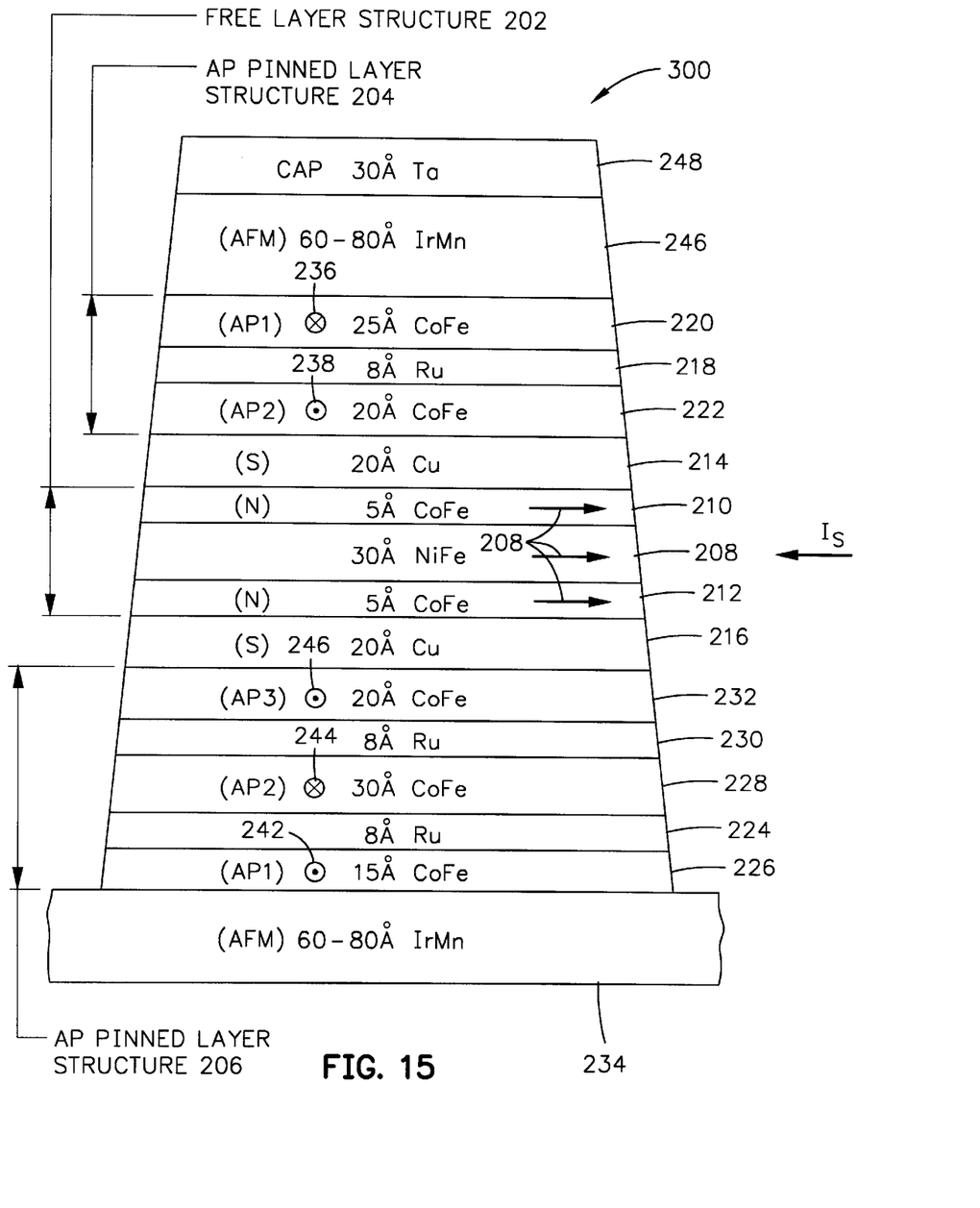
FIG. 15 is the same as FIG. 12 except the order of the layers has been reversed.

Another embodiment of the spin valve sensor 300 is illustrated in FIG. 15. In this embodiment the order of the first and second AP pinned layer structures 204 and 206 is reversed with the second AP pinned layer structure 206 being located below the free layer structure 202 and the first AP pinned layer structure 204 being located above the free layer structure. This means after construction of the first gap layer 148 in FIG. 11 and the pinning layer 234 in FIG. 15 the second AP pinned layer structure 206 is constructed before constructing the free layer structure 202 and the first AP pinned layer structure 204. In this embodiment the sense $I_s$ is directed from right to left as shown in FIG. 15. Further, the current pulse for resetting magnetic spins of the first and second pinning layers 234 and 240 is also from left to right. The magnetic moment 208 of the free layer structure may be oriented from right to left, or from left to right as shown in FIG. 15. In the embodiment in FIG. 15, when a signal field causes the magnetic moment 208 to be rotated upwardly the resistance of the spin valve sensor will increase and when a signal field causes the magnetic moment 208 to be rotated downwardly the resistance will decrease.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:
1. A magnetic read head comprising:
    a file resettable spin valve sensor that includes:
    a ferromagnetic free layer structure that has a magnetic moment that is free to rotate in response to signal fields;
    ferromagnetic first and second antiparallel (AP) pinned layer structures wherein each pinned layer structure has a magnetic moment;
    an antiferromagnetic first pinning layer exchange coupled to the first AP pinned layer structure for pinning the magnetic moment of the first AP pinned layer structure;
    an antiferromagnetic second pinning layer exchange coupled to the second AP pinned layer structure for pinning the magnetic moment of the second AP pinned layer structure;
    a nonmagnetic conductive first spacer layer between the free layer structure and the first AP pinned layer structure;
    a nonmagnetic conductive second spacer layer between the free layer structure and the second AP pinned layer structure; and
    each of the first and second AP pinned layer structures having a plurality of AP pinned layers with one of the first and second AP pinned layer structures having one more AP pinned layer than the other of the first and second AP pinned layer structures.

2. A magnetic read head as claimed in claim 1 further comprising:
nonmagnetic nonconductive first and second read gap layers; the spin valve sensor being located between the first and second read gap layers;
ferromagnetic first and second shield layers; and
the first and second read gap layers being located between the first and second shield layers.

3. A magnetic read head as claimed in claim 2 including:
the first AP pinned layer structure being a double AP pinned structure with an AP coupling layer between first and second AP pinned layers; and
the second AP pinned layer structure being a triple AP pinned structure with first, second and third AP pinned layers with a first AP coupling layer between the first and second AP pinned layers and a second AP coupling layer between the second and third AP pinned layers.

4. A magnetic read head as claimed in claim 2 including:
the free layer structure including a nickel iron (NiFe) layer between first and second cobalt (Co) based layers.

5. A magnetic read head as claimed in claim 2 including:
each of the first and second AP pinned structures exerting a ferromagnetic coupling field and a demagnetization field on the free layer structure that affects a biasing point of the free layer structure; and
the demagnetization fields of the first and second AP pinned structures being equal and counterbalancing one another so that in combination they have no influence on the biasing point of the free layer structure.

6. A magnetic read head as claimed in claim 2 including:
each of the first and second AP pinned structures exerting a ferromagnetic coupling field and a demagnetization field on the free layer structure that affects a biasing point of the free layer structure; and
the demagnetization field of one of the first and second AP pinned structures being greater than the demagnetization field of the other of the first and second AP pinned structures so that there is a net demagnetization field that at least partially counterbalances the ferromagnetic coupling fields exerted on the free layer structure.

7. A magnetic read head as claimed in claim 2 wherein each of the first and second pinning layers is selected from an antiferromagnetic material that has a blocking temperature below 280° C.

8. A magnetic read head as claimed in claim 7 wherein each of the first and second pinning layers is selected from the group consisting of iridium manganese (IrMn), nickel oxide (NiO) and iron manganese (FeMn).

9. A magnetic read head as claimed in claim 8 wherein each of the first and second pinning layers is iridium manganese (IrMn).

10. A magnetic read head as claimed in claim 7 including:
the first AP pinned layer structure being a double AP pinned structure with an AP coupling layer between first and second AP pinned layers; and
the second AP pinned layer structure being a triple AP pinned structure with first, second and third AP pinned layers with a first AP coupling layer between the first and second AP pinned layers and a second AP coupling layer between the second and third AP pinned layers.

11. A magnetic read head as claimed in claim 10 including:
the free layer structure including a nickel iron (NiFe) layer between first and second cobalt (Co) based layers.

12. A magnetic read head as claimed in claim 11 wherein each of the first and second pinning layers is iridium manganese (IrMn).

13. A magnetic read head as claimed in claim 12 including:
each of the first and second AP pinned structures exerting a ferromagnetic coupling field and a demagnetization field on the free layer structure that affects a biasing point of the free layer structure; and
the demagnetization fields of the first and second AP pinned structures being equal and counterbalancing one another so that in combination they have no influence on the biasing point of the free layer structure.

14. A magnetic read head as claimed in claim 12 including:
each of the first and second AP pinned structures exerting a ferromagnetic coupling field and a demagnetization field on the free layer structure that affects a biasing point of the free layer structure; and
the demagnetization field of one of the first and second AP pinned structures being greater than the demagnetization field of the other of the first and second AP pinned structures so that there is a net demagnetization field that at least partially counterbalances the ferromagnetic coupling fields exerted on the free layer structure.

15. A magnetic head assembly having a read head and a write head comprising:
the write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
a file resettable spin valve sensor having first and second side edges;
first and second hard bias and lead layers connected to the first and second side edges of the spin valve sensor;
nonmagnetic nonconductive first and second read gap layers;
the spin valve sensor and the first and second hard bias and lead layers being located between the first and second read gap layers;
a ferromagnetic first shield layer; and
the first and second read gap layers being located between the first shield layer and the first pole piece layer; and
the spin valve sensor including:
a ferromagnetic free layer structure that has a magnetic moment that is free to rotate in response to signal fields;
ferromagnetic first and second antiparallel (AP) pinned layer structures wherein each pinned layer structure has a magnetic moment;
an antiferromagnetic first pinning layer exchange coupled to the first AP pinned layer structure for pinning the magnetic moment of the first AP pinned layer structure;

an antiferromagnetic second pinning layer exchange coupled to the second AP pinned layer structure for pinning the magnetic moment of the second AP pinned layer structure;
a nonmagnetic conductive first spacer layer between the free layer structure and the first AP pinned layer structure;
a nonmagnetic conductive second spacer layer between the free layer structure and the second AP pinned layer structure; and
each of the first and second AP pinned layer structures having a plurality of AP pinned layers with one of the first and second AP pinned layer structures having one more AP pinned layer than the other of the first and second AP pinned layer structures.

16. A magnetic head assembly as claimed in claim 15 including:
the read head further including:
a ferromagnetic second shield layer;
a nonmagnetic separation layer; and
the separation layer being located between the second shield layer the first pole piece layer.

17. A magnetic head assembly as claimed in claim 15 wherein each of the first and second pinning layers is selected from an antiferromagnetic material that has a blocking temperature below 280° C.

18. A magnetic head assembly as claimed in claim 17 including:
the first AP pinned layer structure being a double AP pinned structure with an AP coupling layer between first and second AP pinned layers; and
the second AP pinned layer structure being a triple AP pinned structure with first, second and third AP pinned layers with a first AP coupling layer between the first and second AP pinned layers and a second AP coupling layer between the second and third AP pinned layers.

19. A magnetic head assembly as claimed in claim 18 including:
the free layer structure including a nickel iron (NiFe) layer between first and second cobalt (Co) based layers.

20. A magnetic head assembly as claimed in claim 19 wherein each of the first and second pinning layers is iridium manganese (IrMn).

21. A magnetic head assembly as claimed in claim 20 including:
each of the first and second AP pinned structures exerting a ferromagnetic coupling field and a demagnetization field on the free layer structure that affects a biasing point of the free layer structure; and
the demagnetization fields of the first and second AP pinned structures being equal and counterbalancing one another so that in combination they have no influence on the biasing point of the free layer structure.

22. A magnetic head assembly as claimed in claim 20 including:
each of the first and second AP pinned structures exerting a ferromagnetic coupling field and a demagnetization field on the free layer structure that affects a biasing point of the free layer structure; and
the demagnetization field of one of the first and second AP pinned structures being greater than the demagnetization field of the other of the first and second AP pinned structures so that there is a net demagnetization field that at least partially counterbalances the ferromagnetic coupling fields exerted on the free layer structure.

23. A magnetic disk drive having at least one slider that has an air bearing surface (ABS), the slider supporting at least one magnetic head assembly that includes a read head and a write head, the disk drive comprising:
the write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
a file resettable spin valve sensor having first and second side edges;
first and second hard bias and lead layers connected to the first and second side edges of the spin valve sensor;
nonmagnetic nonconductive first and second read gap layers;
the spin valve sensor and the first and second hard bias and lead layers being located between the first and second read gap layers;
a ferromagnetic first shield layer; and
the first and second read gap layers being located between the first shield layer and the first pole piece layer; and
the spin valve sensor including:
a ferromagnetic free layer structure that has a magnetic moment that is free to rotate in response to signal fields;
ferromagnetic first and second antiparallel (AP) pinned layer structures wherein each pinned layer structure has a magnetic moment;
an antiferromagnetic first pinning layer exchange coupled to the first AP pinned layer structure for pinning the magnetic moment of the first AP pinned layer structure;
an antiferromagnetic second pinning layer exchange coupled to the second AP pinned layer structure for pinning the magnetic moment of the second AP pinned layer structure;
a nonmagnetic conductive first spacer layer between the free layer structure and the first AP pinned layer structure;
a nonmagnetic conductive second spacer layer between the free layer structure and the second AP pinned layer structure; and
each of the first and second AP pinned layer structures having a plurality of AP pinned layers with one of the first and second AP pinned layer structures having one more AP pinned layer than the other of the first and second AP pinned layer structures; and
a housing;
a magnetic disk rotatably supported in the housing;
a support mounted in the housing for supporting the magnetic head assembly with its ABS facing the magnetic disk so that the magnetic head assembly is in a transducing relationship with the magnetic disk;
a spindle motor for rotating the magnetic disk;
an actuator connected to the support for moving the magnetic head assembly to multiple positions with respect to said magnetic disk; and
a processor connected to the magnetic head assembly, to the spindle motor and to the actuator for exchanging signals with the magnetic head assembly, for controlling rotation of the magnetic disk and for controlling the position of the magnetic head assembly relative to the magnetic disk.

24. A magnetic disk drive as claimed in claim 23 including:
the read head further including:
a ferromagnetic second shield layer;
a nonmagnetic separation layer; and
the separation layer being located between the second shield layer the first pole piece layer.

25. A magnetic disk drive as claimed in claim 23 wherein each of the first and second pinning layers is selected from an antiferromagnetic material that has a blocking temperature below 280° C.

26. A magnetic disk drive as claimed in claim 25 including:
the first AP pinned layer structure being a double AP pinned structure with an AP coupling layer between first and second AP pinned layers; and
the second AP pinned layer structure being a triple AP pinned structure with first, second and third AP pinned layers with a first AP coupling layer between the first and second AP pinned layers and a second AP coupling layer between the second and third AP pinned layers.

27. A magnetic disk drive as claimed in claim 26 including:
the free layer structure including a nickel iron (NiFe) layer between first and second cobalt (Co) based layers.

28. A magnetic disk drive as claimed in claim 27 wherein each of the first and second pinning layers is iridium manganese (IrMn).

29. A magnetic head assembly as claimed in claim 28 including:
each of the first and second AP pinned structures exerting a ferromagnetic coupling field and a demagnetization field on the free layer structure that affects a biasing point of the free layer structure; and
the demagnetization fields of the first and second AP pinned structures being equal and counterbalancing one another so that in combination they have no influence on the biasing point of the free layer structure.

30. A magnetic head assembly as claimed in claim 28 including:
each of the first and second AP pinned structures exerting a ferromagnetic coupling field and a demagnetization field on the free layer structure that affects a biasing point of the free layer structure; and
the demagnetization field of one of the first and second AP pinned structures being greater than the demagnetization field of the other of the first and second AP pinned structures so that there is a net demagnetization field that at least partially counterbalances the ferromagnetic coupling fields exerted on the free layer structure.

31. A method of making a read head that includes a resettable spin valve sensor comprising the steps of:
a making of the spin valve sensor comprising the steps of:
forming a ferromagnetic free layer structure that has a magnetic moment that is free to rotate in response to signal fields;
forming ferromagnetic first and second antiparallel (AP) pinned layer structures wherein each pinned layer structure has a magnetic moment;
forming an antiferromagnetic first pinning layer exchange coupled to the first AP pinned layer structure for pinning the magnetic moment of the first AP pinned layer structure;

forming an antiferromagnetic second pinning layer exchange coupled to the second AP pinned layer structure for pinning the magnetic moment of the second AP pinned layer structure;
forming a nonmagnetic conductive first spacer layer between the free layer structure and the first AP pinned layer structure;
forming a nonmagnetic conductive second spacer layer between the free layer structure and the second AP pinned layer structure; and
forming each of the first and second AP pinned layer structures with a plurality of AP pinned layers with one of the first and second AP pinned layer structures having one more AP pinned layer than the other of the first and second AP pinned layer structure.

32. A method as claimed in claim 31 further comprising the steps of:
forming nonmagnetic nonconductive first and second read gap layers with the spin valve sensor located therebetween; and
forming ferromagnetic first and second shield layers with the first and second read gap layers located therebetween.

33. A method as claimed in claim 32 further comprising the steps of:
forming the first AP pinned layer structure as a double AP pinned structure with an AP coupling layer between first and second AP pinned layers; and
forming the second AP pinned layer structure as a triple AP pinned structure with first, second and third AP pinned layers with a first AP coupling layer located between the first and second AP pinned layers and a second AP coupling layer located between the second and third AP pinned layers.

34. A method as claimed in claim 32 wherein the free layer structure is formed with a nickel iron (NiFe) layer between first and second cobalt (Co) based layers.

35. A method as claimed in claim 32 wherein each of the first and second AP pinned structures is formed with a ferromagnetic coupling field and a demagnetization field on the free layer structure that affects a biasing point of the free layer structure and with the demagnetization fields of the first and second AP pinned structures being equal so that they counterbalance one another and, in combination, have no influence on the biasing point of the free layer structure.

36. A method as claimed in claim 32 wherein each of the first and second AP pinned structures is formed with a ferromagnetic coupling field and a demagnetization field on the free layer structure that affects a biasing point of the free layer structure and with the demagnetization field of one of the first and second AP pinned structures being greater than the demagnetization field of the other of the first and second AP pinned structures so that there is a net demagnetization field that at least partially counterbalances the ferromagnetic coupling fields exerted on the free layer structure.

37. A method as claimed in claim 32 wherein each of the first and second pinning layers is formed from an antiferromagnetic material that has a blocking temperature below 280°.

38. A method as claimed in claim 39 wherein each of the first and second pinning layers is formed from the group consistung of iridium manganese (IrMn), nickel oxide (NiOP) and iron manganese (FeMn).

39. A method as claimed in claim 38 wherein each of the first and second pinning layers is formed of iridium manganese (IrMn).

40. A method as claimed in claim 37 further comprising the steps of:

forming the first AP pinned layer structure as a double AP pinned structure with an AP coupling layer between first and second AP pinned layers; and forming the second AP pinned layer structure as a triple AP pinned structure with first, second and third AP pinned layers with a first AP coupling layer located between the first and second AP pinned layers and a second AP coupling layer located between the second and third AP pinned layers.

41. A method as claimed in claim 40 wherein the free layer structure is formed with a nickel iron (NiFe) layer between first and second cobalt (Co) based layers.

42. A method as claimed in claim 41 wherein each of the first and second pinning layers is formed of iridium manganese (IrMn).

43. A method as claimed in claim 42 wherein each of the first and second AP pinned structures is formed with a ferromagnetic coupling field and a demagnetization field on the free layer structure that affects a biasing point of the free layer structure and with the demagnetization fields of the first and second AP pinned structures being equal so that they counterbalance one another and, in combination, have no influence on the biasing point of the free layer structure.

44. A method as claimed in claim 42 wherein each of the first and second AP pinned structures is formed with a ferromagnetic coupling field and a demagnetization field on the free layer structure that affects a biasing point of the free layer structure and with the demagnetization field of one of the first and second AP pinned structures being greater than the demagnetization field of the other of the first and second AP pinned structures so that there is a net demagnetization field that at least partially counterbalances the ferromagnetic coupling fields exerted on the free layer structure.

45. A method of making a magnetic head assembly having a read head and a write head comprising the steps of:

a forming of the write head comprising the steps of:
forming ferromagnetic first and second pole piece layers with a yoke portion between a pole tip portion and a back gap portion;
forming a nonmagnetic write gap layer between the pole tip portions of the first and second pole piece layers;
forming an insulation stack with at least one coil layer embedded therein in the yoke portions of the first and second pole piece layers; and
connecting the first and second pole piece layers at their back gap portions; and a making of the read head comprising the steps of:
forming a file resettable spin valve sensor having first and second side edges;
forming and connecting first and second hard bias and lead layers to the first and second side edges of the spin valve sensor;
forming nonmagnetic nonconductive first and second read gap layers with the spin valve sensor located between the first and second read gap layers;
forming a ferromagnetic first shield layer with the first and second read gap layers located between the first shield layer and the first pole piece layer, and a making of the spin valve sensor comprising the steps of:
forming a ferromagnetic free layer structure that has a magnetic moment that is free to rotate in response to signal fields;
forming ferromagnetic first and second antiparallel (AP) pinned layer structures wherein each pinned layer structure has a magnetic moment;
forming an antiferromagnetic first pinning layer exchange coupled to the first AP pinned layer structure for pinning the magnetic moment of the first AP pinned layer structure;
forming an antiferromagnetic second pinning layer exchange coupled to the second AP pinned layer structure for pinning the magnetic moment of the second AP pinned layer structure;
forming a nonmagnetic conductive first spacer layer between the free layer and the first AP pinned layer structure;
forming a nonmagnetic conductive second spacer layer between the free layer structure and the second AP pinned layer structure; and
forming each of the first and second AP pinned layer structures with a plurality of AP pinned layers with one of the first and second AP pinned layer structures having one more AP pinned layer than the other of the first and second AP pinned layer structure.

46. A method as claimed in claim 45 further comprising the steps of:
forming a ferromagnetic second shield layer between the second read gap layer and the first pole piece layer; and
forming a nonmagnetic separation layer between the second shield layer the first pole piece layer.

47. A method as claimed in claim 45 further comprising the steps of:
forming and connecting processing circuitry to the first and second hard bias and lead layers for conducting a reset current through the spin valve sensor for resetting magnetic moments of the first and second AP pinned layer structures.

48. A method as claimed in claim 47 further comprising the step of conducting said reset current through the spin valve sensor.

49. A method as claimed in claim 45 wherein each of the first and second pinning layers is formed from an antiferromagnetic material that has a blocking temperature below 280°.

50. A method as claimed in claim 49 further comprising the steps of:
forming the first AP pinned layer structure as a double AP pinned structure with an AP coupling layer between first and second AP pinned layers; and
forming the second AP pinned layer structure as a triple AP pinned structure with first, second and third AP pinned layers with a first AP coupling layer located between the first and second AP pinned layers and a second AP coupling layer located between the second and third AP pinned layers.

51. A method as claimed in claim 50 wherein the free layer structure is formed with a nickel iron (NiFe) layer between first and second cobalt (Co) based layers.

52. A method as claimed in claim 51 wherein each of the first and second pinning layers is formed of iridium manganese (IrMn).

53. A method as claimed in claim 52 wherein each of the first and second AP pinned structures is formed with a ferromagnetic coupling field and a demagnetization field on the free layer structure that affects a biasing point of the free layer structure and with the demagnetization fields of the first and second AP pinned structures being equal so that they counterbalance one another and, in combination, have no influence on the biasing point of the free layer structure.

54. A method as claimed in claim 52 wherein each of the first and second AP pinned structures is formed with a ferromagnetic coupling field and a demagnetization field on the free layer structure that affects a biasing point of the free layer structure and with the demagnetization field of one of the first and second AP pinned structures being greater than the demagnetization field of the other of the first and second AP pinned structures so that there is a net demagnetization field that at least partially counterbalances the ferromagnetic coupling fields exerted on the free layer structure.

* * * * *